United States Patent
Ono et al.

(10) Patent No.: US 12,226,874 B2
(45) Date of Patent: Feb. 18, 2025

(54) GLASS SUBSTRATE AND METHOD FOR MANUFACTURING SAME

(71) Applicant: AGC Inc., Tokyo (JP)

(72) Inventors: Takeaki Ono, Tokyo (JP); Koki Moriya, Tokyo (JP)

(73) Assignee: AGC INC., Tokyo (JP)

( * ) Notice: Subject to any disclaimer, the term of this patent is extended or adjusted under 35 U.S.C. 154(b) by 358 days.

(21) Appl. No.: 17/571,184

(22) Filed: Jan. 7, 2022

(65) Prior Publication Data

US 2022/0126416 A1    Apr. 28, 2022

Related U.S. Application Data

(63) Continuation of application No. PCT/JP2020/025670, filed on Jun. 30, 2020.

(30) Foreign Application Priority Data

Jul. 10, 2019    (JP) ................... 2019-128071

(51) Int. Cl.
*B24B 9/10*    (2006.01)
*C03C 19/00*    (2006.01)

(52) U.S. Cl.
CPC ............... *B24B 9/10* (2013.01); *C03C 19/00* (2013.01)

(58) Field of Classification Search
CPC .................................. B24B 9/10; C03C 19/00
USPC ....................................................... 428/157
See application file for complete search history.

(56) References Cited

U.S. PATENT DOCUMENTS

| | | | | |
|---|---|---|---|---|
| 2013/0122265 | A1* | 5/2013 | Miyamoto | ............... G06T 7/40 428/192 |
| 2013/0255880 | A1* | 10/2013 | Mahdi | ................... C09J 175/04 156/331.7 |
| 2014/0170387 | A1* | 6/2014 | Kashima | ................ C03C 21/00 428/157 |
| 2016/0280590 | A1 | 9/2016 | Kashima et al. | |
| 2017/0121578 | A1* | 5/2017 | Garmann | .................. B32B 7/12 |
| 2018/0147819 | A1 | 5/2018 | Miyamoto et al. | |

(Continued)

FOREIGN PATENT DOCUMENTS

| EP | 2987744 B1 * | 7/2017 | .......... B29C 53/066 |
|---|---|---|---|
| JP | 2011-108355 A | 6/2011 | |

(Continued)

OTHER PUBLICATIONS

International Searching Authority, "International Search Report," issued in connection with International Patent Application No. PCT/JP2020/025670, dated Sep. 24, 2020.

(Continued)

*Primary Examiner* — Travis M Figg
(74) *Attorney, Agent, or Firm* — Foley & Lardner LLP

(57) ABSTRACT

A glass substrate includes: a first major surface; a second major surface that is opposite to the first major surface; an end surface interposed between the first major surface and the second major surface; a first boundary surface that is interposed between the first major surface and the end surface and connected to the end surface; and a second boundary surface that is connected to the first major surface and the first boundary surface. The second boundary surface is a convex curved surface, and the second boundary surface has a radius of curvature $R_2$ of 0.1 mm or larger and 2.0 mm or smaller.

9 Claims, 3 Drawing Sheets

(56) References Cited

U.S. PATENT DOCUMENTS

| | | | | |
|---|---|---|---|---|
| 2018/0304607 A1* | 10/2018 | Öhman | ................... | B32B 15/12 |
| 2019/0094604 A1* | 3/2019 | Inoue | ...................... | C03C 15/00 |
| 2019/0315540 A1* | 10/2019 | Veit | ................... | B65D 75/5844 |
| 2020/0270042 A1* | 8/2020 | Kehoe | ..................... | A01N 47/44 |
| 2020/0307171 A1* | 10/2020 | Koesters | ................... | B32B 5/02 |
| 2021/0047096 A1* | 2/2021 | Obermann | ................ | B32B 7/12 |

FOREIGN PATENT DOCUMENTS

| | | | | |
|---|---|---|---|---|
| JP | 2015-058507 A | 3/2015 | | |
| JP | 2017-120416 A | 7/2017 | | |
| WO | WO-9834982 A1 * | 8/1998 | ............. | C08K 5/07 |
| WO | WO-2010/104039 A1 | 9/2010 | | |
| WO | WO-2011/162163 A1 | 12/2011 | | |
| WO | WO-2012/005019 A1 | 1/2012 | | |
| WO | WO-2013/031548 A1 | 3/2013 | | |
| WO | WO-2017208995 A1 * | 12/2017 | ............. | C03C 19/00 |

OTHER PUBLICATIONS

International Searching Authority, "Written Opinion," issued in connection with International Patent Application No. PCT/JP2020/025670, dated Sep. 24, 2020.

Extended European Search Report issued in connection with EP Appl. Ser. No. 20836632.8 dated Jul. 4, 2023.

\* cited by examiner

GLASS SUBSTRATE AND METHOD FOR MANUFACTURING SAME

CROSS-REFERENCE TO RELATED APPLICATIONS

This is a bypass continuation of International Patent Application No. PCT/JP2020/025670, filed on Jun. 30, 2020, which claims priority to Japanese Patent Application No. 2019-128071, filed on Jul. 10, 2019. The contents of these applications are 10 hereby incorporated by reference in their entireties.

TECHNICAL FIELD

The present invention relates to a glass substrate and a manufacturing method thereof.

BACKGROUND ART

An in-vehicle display device such as a car navigation device is installed in vehicles such as automobiles.

From the viewpoint of protecting a display panel, a cover member made of glass (cover glass) is used in in-vehicle display devices (refer to Patent literature 1, for example).

CITATION LIST

Patent Literature

Patent document 1: WO 2017/208995

SUMMARY OF INVENTION

Technical Problem

Unlike in stationary display devices that are fixed in installation position, in in-vehicle display devices installed in vehicles, the direction and intensity of light that shines on the cover glass change rapidly. Thus, there is a case where strong light shines on a chamfered portion of the cover glass.

According to a study made by the inventors, there is a case where a driver feels that light reflected by a chamfered portion is dazzling depending on a glass substrate that is used as a cover glass. Such reflection light may suffer driving if it enters the eyes of a driver.

It is therefore preferable that a glass substrate that is used as, for example, a cover glass of an in-vehicle display device is suppressed in the glare that is caused by light reflected from chamfered positions (hereinafter referred to as "high in chamfered portion antiglare property").

The present invention has been made in view of the above, and an object of the present invention is therefore to provide a glass substrate that is high in chamfered portion antiglare property and a manufacturing method thereof.

Solution to Problem

Having studied diligently, the inventors have found that the above object can be attained by employing the following configurations and thus completed the invention.

That is, the invention provides the following items [1] to [10]:

[1] A glass substrate comprising a first major surface, a second major surface that is opposite to the first major surface, an end surface interposed between the first major surface and the second major surface, a first boundary surface that is interposed between the first major surface and the end surface and connected to the end surface, and a second boundary surface that is connected to the first major surface and the first boundary surface, wherein the second boundary surface is a convex curved surface, and the second boundary surface has a radius of curvature $R_2$ of 0.1 mm or larger and 2.0 mm or smaller.

[2] The glass substrate according to item [1], wherein an angle $\theta_1$ formed by the second boundary surface and the first major surface is 10° or larger and 45° or smaller.

[3] The glass substrate according to item [1] or [2], wherein the first boundary surface is a convex curved surface, and the first boundary surface has a radius of curvature $R_1$ of 0.1 mm or larger and 1.0 mm or smaller.

[4] The glass substrate according to item [3], wherein the radius of curvature $R_2$ of the second boundary surface is larger than the radius of curvature $R_1$ of the first boundary surface.

[5] The glass substrate according to any one of items [1] to [4], comprising a bent portion where the first major surface and the second major surface are bent.

[6] The glass substrate according to any one of items [1] to [5], wherein a chip size in the second boundary surface is 0.08 mm or smaller.

[7] The glass substrate according to any one of items [1] to [6], wherein a difference between a distance $L_1$ from the end surface to the first major surface in a direction of a tangential line, extending from the end surface toward the first major surface and a distance $L_2$ from the end surface to the second major surface in a direction of a tangential line, extending from the end surface toward the second major surface is 0.2 mm or smaller.

[8] The glass substrate according to any one of items [1] to [7], wherein the glass substrate is used as a cover glass of a display device.

[9] The glass substrate according to item [8], wherein the display device is an in-vehicle display device.

[10] A method for manufacturing the glass substrate according to any one of items [1] to [9], including:
preparing a glass plate; and
grinding the glass plate using a rotary whetstone, wherein the rotary whetstone has a grinding surface that is shaped so as to conform to shapes of the first boundary surface and the second boundary surface.

Advantageous Effects of Invention

The invention can provide a glass substrate that is high in chamfered portion antiglare property and a manufacturing method thereof.

DESCRIPTION OF EMBODIMENT

A preferred embodiment of the present disclosure is hereinafter described with reference to the drawings.

However, the invention is not limited to the following embodiment. Various changes and modifications can be made of the following embodiment without departing from the spirit and scope of the invention.

[Glass Substrate]

Figure 1:
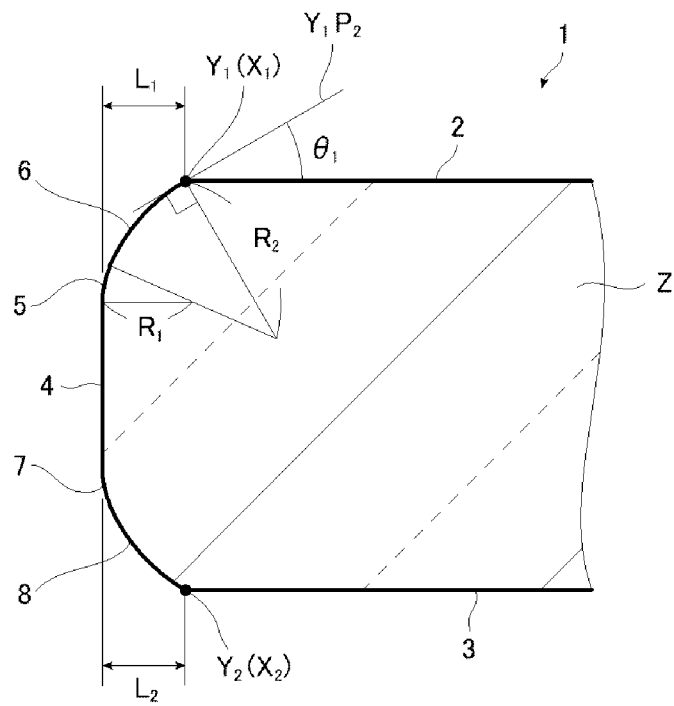
FIG. 1 is a sectional view of a glass substrate.

FIG. 1 is a sectional view of a glass substrate 1.

The glass substrate 1 is plate-like glass and has a first major surface 2 and a second major surface 3 which is opposite to the first major surface 2. The first major surface 2 and the second major surface 3 are surfaces that are parallel with each other.

The glass substrate 1 has an end surface 4 which is interposed between the first major surface 2 and the second major surface 3.

In FIG. 1, the end surface 4 is drawn as a flat surface that is perpendicular to the first major surface 2 and the second major surface 3. However, the end surface 4 may be a convex curved surface like a first boundary surface 5 and a second boundary surface 6 (described later).

The glass substrate 1 has the first boundary surface 5 which is located between the first major surface 2 and the end surface 4. The first boundary surface 5 is connected to the end surface 4.

The glass substrate 1 further has the second boundary surface 6 which is located between the first major surface 2 and the first boundary surface 5. The second boundary surface 6 is connected to the first boundary surface 5 and the first major surface 2.

The second boundary surface 6 is a convex curved surface.

The radius of curvature $R_2$ of the second boundary surface 6 is 0.1 mm or larger and 2.0 mm or smaller.

In the following, the first boundary surface 5 and the second boundary surface 6 of the glass substrate 1 may be together referred to as a "chamfered portion."

As described below, in the case where such a glass substrate 1 is used as a cover glass of an in-vehicle display device, the glass substrate is high in chamfered portion antiglare property.

Figure 2:
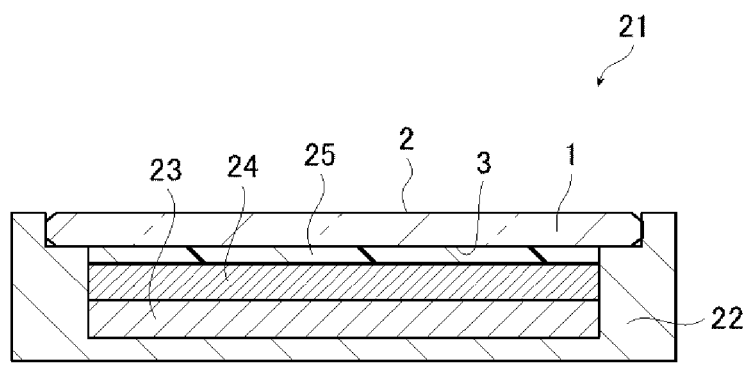
FIG. 2 is a sectional view of an in-vehicle display device.

FIG. 2 is a sectional view of an in-vehicle display device 21.

The in-vehicle display device 21 shown in FIG. 2 is a car navigation device, for example.

The in-vehicle display device 21 has a body 22 which houses individual units and members. A backlight unit 23 is housed in the body 22 and a display panel 24 which is a liquid crystal panel is disposed on the backlight unit 23. For example, the display panel 24 may be an organic EL panel, an electronic ink panel, or the like and may have a touch panel or the like.

The glass substrate 1 is bonded to the display panel 24 via an adhesive layer 25 in such a manner that the second major surface 3 of the glass substrate 1 is in contact with the adhesive layer 25. The adhesive layer 25 is an OCA (optical clear adhesive), for example. The glass substrate 1 functions as a cover member (cover glass) which covers the display panel 24.

In the in-vehicle display device 21, the second major surface 3 of the glass substrate 1 is a surface that is opposed to the display panel 24.

On the other hand, being a surface that is not opposed to the display panel 24, the first major surface 2 of the glass substrate 1 is located on the side of a user (e.g., driver) of the in-vehicle display device 21.

Since the in-vehicle display device 21 is installed in a vehicle, the direction and intensity of light that shines on the first major surface 2 of the glass substrate 1 change rapidly.

As a result, there is a case where strong light hits the chamfered portion (first boundary surface 5 and second boundary surface 6) of the glass substrate 1 and produces reflection light.

However, in the embodiment, the glare caused by reflection light coming from the chamfered portion of the glass substrate 1 is suppressed. That is, the chamfered portion antiglare property is high.

It is inferred that the amount of reflection light entering the eyes is reduced because the glass substrate 1 has the above-mentioned second boundary surface 6.

Let's return to the description of FIG. 1.

<Radius of Curvature $R_2$ of Second Boundary Surface>

As described above, the second boundary surface 6 is a convex curved surface and its radius of curvature $R_2$ is 0.1 mm or larger and 2.0 mm or smaller.

Because of higher chamfered portion antiglare property, it is preferable that the radius of curvature $R_2$ of the second boundary surface 6 is 0.2 mm or larger, even preferably 0.3 mm or larger, further preferably 0.4 mm or larger, and particularly preferably 0.6 mm or larger.

For the same reason, that is, because of higher chamfered portion antiglare property, it is preferable that the radius of curvature $R_2$ of the second boundary surface 6 is 1.5 mm or smaller, even preferably 1.2 mm or smaller and further preferably 1.0 mm or smaller.

<Angle $\theta_1$ Formed by Second Boundary Surface and First Major Surface>

Because of higher chamfered portion antiglare property, it is preferable that the angle $\theta_1$ formed by the second boundary surface 6 and the first major surface 2 is 10° or larger and 45° or smaller, even preferably 15° or larger and 35° or smaller.

<Chip Size>

Chips are formed in a glass surface and a portion where such chips are formed may produce reflection light that is particularly strong.

Thus, because of higher chamfered portion antiglare property, it is preferable that the size of chips is 0.08 mm or smaller, even preferably 0.05 mm or smaller.

A size of chips is measured by observing a surface of the glass substrate 1 at a magnification ×100 using a confocal laser scanning microscope (e.g., "OLS3000 produced by Olympus Corporation).

Observation is performed in five arbitrary fields of view, a chip having a longest diameter is found, and the longest diameter thus found is employed as a chip size. A longest one of distances between two points in a chip region in an image of an observed field of view is employed as a diameter.

<Radius of Curvature $R_1$ of First Boundary Surface>

It is preferable that the first boundary surface 5 may be a convex curved surface.

In this case, because of higher chamfered portion antiglare property, it is preferable that the radius of curvature $R_1$ of the first boundary surface 5 is 0.1 mm or larger, even preferably 0.3 mm or larger.

For the same reason, that is, because of higher chamfered portion antiglare property, it is preferable that the radius of curvature $R_1$ of the first boundary surface 5 is 1.0 mm or smaller, even preferably 0.8 mm or smaller.

<Relationship Between Radius of Curvature $R_1$ and Radius of Curvature $R_2$>

Because of higher chamfered portion antiglare property, it is preferable that the radius of curvature $R_2$ of the second boundary surface 6 is larger than the radius of curvature $R_1$ of the first boundary surface 5.

<Third Boundary Surface and Fourth Boundary Surface>

As shown in FIG. 1, the glass substrate 1 may have a third boundary surface 7 which is located between the second major surface 3 and the end surface 4. The third boundary surface 7 is connected to the end surface 4.

The glass substrate 1 may further have a fourth boundary surface 8 which is located between the second major surface 3 and the third boundary surface 7. The fourth boundary surface 8 is connected to the second major surface 3 and the third boundary surface 7.

It is preferable that each of the third boundary surface 7 and the fourth boundary surface 8 is convex curved surface.

The radius of curvature of the third boundary surface 7 may be either the same as or different from the radius of curvature $R_1$ of the first boundary surface 5.

The radius of curvature of the fourth boundary surface 8 may be either the same as or different from the radius of curvature $R_2$ of the second boundary surface 6.

The third boundary surface 7 and the fourth boundary surface 8 may constitute a continuous surface having a common radius of curvature.

<Surface Width>

It is preferable that the difference (hereinafter also referred to as a "surface width" for the sake of convenience) between the distance $L_1$ from the end surface 4 to the first major surface 2 in the direction of a tangential line, extending from the end surface 4 toward the first major surface 2 and the distance $L_2$ from the end surface 4 to the second major surface 3 in the direction of a tangential line, extending from the end surface 4 toward the second major surface 3 is 0.2 mm or smaller, even preferably 0.1 mm or smaller.

Radii of curvatures $R_1$ and $R_2$, distances $L_1$ and $L_2$, and an angle $\theta_1$ are measured at a magnification of, for example, ×100 to ×200 using a contour measuring device (e.g., a contour recorder produced by Tokyo Seimitsu Co., Ltd.).

A method for determining radii of curvatures $R_1$ and $R_2$ is described with reference to FIG. 5.

Figure 5:
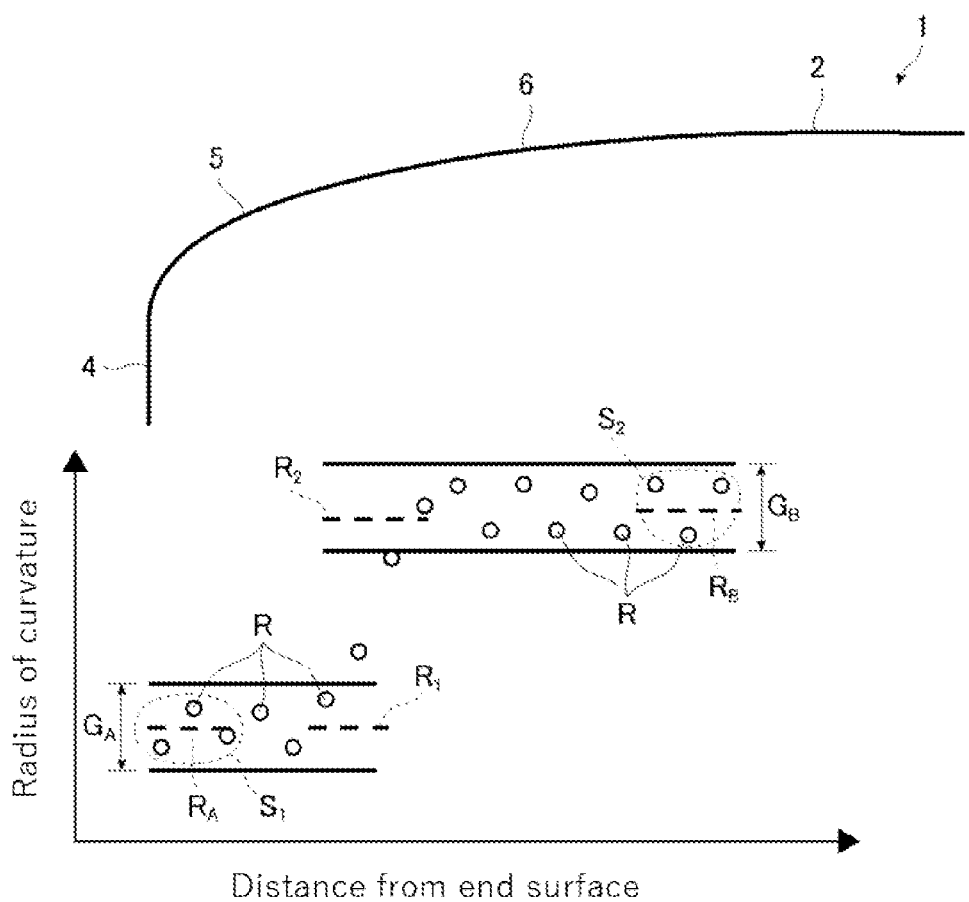
FIG. 5 is a graph illustrating how to determine radii of curvature.

FIG. 5 is a graph illustrating how to determine radii of curvature. An outline shape of the glass substrate 1 is also shown in a top portion of FIG. 5.

First, an outline shape of the glass substrate 1 is measured using the contour measuring device and radii of curvature R of the chamfered portion (first boundary surface 5 and second boundary surface 6) are calculated, for example, every 10 μm from the side of the end surface 4. Plural points representing calculated radii of curvature R are plotted in FIG. 5.

First, an average value $R_A$ (represented by a broken line in FIG. 5) of radii of curvature R (radii of curvature R enclosed by a broken line $S_1$ in FIG. 5) corresponding to three respective points that are closest to the end surface 4 among the calculated radii of curvature R is calculated. Subsequently, plural radii of curvature R that are included in a range GA having the average value $R_A$ as a center value are selected and their average value is employed as a radius of curvature $R_1$ (indicated by a broken line in FIG. 5).

Likewise, an average value $R_B$ (represented by a broken line in FIG. 5) of radii of curvature R (radii of curvature R enclosed by a broken line $S_2$ in FIG. 5) corresponding to three respective points that are closest to the first major surface 2 is calculated. Subsequently, plural radii of curvature R that are included in a range GB having the average value $R_B$ as a center value are selected and their average value is employed as a radius of curvature $R_2$ (indicated by a broken line in FIG. 5).

For example, the ranges GA and GB are ranges of ±50 μm from the average values $R_A$ and $R_B$, respectively. The value 50 μm is set as appropriate taking working accuracy and measurement accuracy into consideration; alternatively, a range of ±100±70±30 μm, or the like may be set. In this manner, radii of curvature $R_1$ and $R_2$ can be calculated efficiently irrespective of the lengths of the first boundary surface 5 and the second boundary surface 6 or even in a case that plural radii of curvature R exist.

The lengths $L_1$ and $L_2$ are defined as follows.

Refer to FIG. 1.

An arbitrary point on an intersection line $X_1$ of the first major surface 2 and the second boundary surface 6 is employed as a point $Y_1$. A plane (cross section) that passes through the point $Y_1$ and intersects the intersection line $X_1$ perpendicularly is employed as a cross section Z. The cross section Z is also a plane (cross section) that is perpendicular to a tangential line of the intersection line $X_1$ at the point $Y_1$. A distance $L_1$ is defined as a longest one of distances from the points $Y_1$ to the end surface 4 in the cross sections Z in the direction that is parallel with the first major surface 2.

Then a point on an intersection line $X_2$ of the second major surface 3 and the fourth boundary surface 8 and is in a cross section Z is employed as a point $Y_2$. A distance $L_2$ is defined as a longest one of distances from the points $Y_2$ to the end surface 4 in the cross sections Z in the direction that is parallel with the second major surface 3.

Where the end surface 4 is a convex curved surface, a distance from the apex (projected most) of the curved surface is measured. In this case, the term "end surface" should read as an "apex."

The angle $\theta_1$ is described with reference to FIG. 6.

Figure 6:
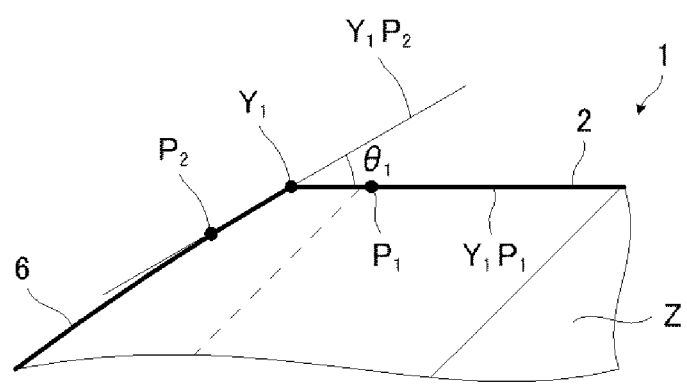
FIG. 6 is an enlarged view of FIG. 1.

FIG. 6 is an enlarged view of FIG. 1. Portions having the same portions described above with reference to FIG. 1 is given the same symbols as the latter and is not described.

A point $P_1$ is a point on the first major surface 2 and the distance (a distance in the direction that is parallel with the first major surface 2) between the point $Y_1$ and the point $P_1$ is equal to 50 μm. A straight line passing through the point $Y_1$ and the point $P_1$ is employed as a straight line $Y_1P_1$.

A point $P_2$ is a point on the second boundary surface 6 and the distance (a distance in the direction that is parallel with the first major surface 2) between the point $Y_1$ and the point $P_2$ is equal to 50 μm. A straight line passing through the point $Y_1$ and the point $P_2$ is employed as a straight line $Y_1P_2$.

An angle formed by the straight line $Y_1P_1$ and the straight line $Y_1P_2$ is employed as an angle $\theta_1$.

<Chemically Strengthened Glass>

When the glass substrate 1 is used as a cover glass, it is preferable that the glass substrate 1 is glass that has been subjected to chemically strengthening treatment (chemically strengthened glass).

A compressive stress layer is formed in a surface layer of chemically strengthened glass.

It is preferable that the depth (DOL) of the compressive stress layer is 10 μm or larger, even preferably 15 μm or larger and further preferably 25 μm or larger.

It is preferable that the compressive stress value (CS) of the compressive stress layer is 500 MPa or larger, even preferably 650 MPa or larger and further preferably 750 MPa or larger. On the other hand, it is preferable that the compressive stress value of the compressive stress layer is 1,200 MPa or smaller.

A compressive stress value (CS) and a compressive stress layer depth (DOL) of the compressive stress layer can be measured using, for example, a surface stress meter ("FSM-6000" produced by Orihara Industrial Co., Ltd.) or a scattered light photoelastic stress meter (e.g., "SLP-2000" produced by Orihara Industrial Co., Ltd.).

<Functional Layer>

A functional layer may be formed on the first major surface 2 and/or the second major surface 3 of the glass substrate 1. Examples of the functional layer are an antireflection layer, an antiglare layer (AG layer), an antifouling layer, and a light shield layer.

The functional layer may be formed either by subjecting a surface layer of the glass substrate 1 to certain treatment or by laying another layer on the surface of the glass substrate 1.

<Thickness, Shapes, and Sizes>

It is preferable that the thickness of the glass substrate 1 is 0.5 mm or larger and 2.5 mm or smaller, even preferably 0.7 mm or larger and 2.0 mm or smaller.

The shapes and sizes of the major surfaces (first major surface 2 and second major surface 3) of the glass substrate 1 are determined as appropriate according to, for example, the shape etc. of the in-vehicle display device 21 in which it is used.

<Bent Portion>

Figure 3:
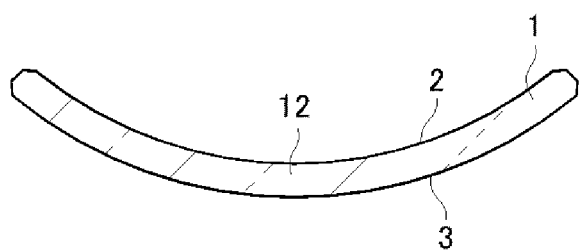
FIG. 3 is a sectional view of a modification of the glass substrate.

FIG. 3 is a sectional view of a modification of the glass substrate 1.

Although the glass substrate 1 shown in FIG. 1 is flat-plate-shaped glass, the shape of the glass substrate 1 is not limited to that shape.

For example, as shown in FIG. 3, the glass substrate 1 may have a bent portion 12. In the bent portion 12, the first major surface 2 is bent (curved) concavely and the other major surface, that is, the second major surface 3, is bent (curved) convexly.

Where the glass substrate 1 has the bent portion 12, the radius of curvature of the bent portion 12 is, for example, 10 mm or larger and 100 mm or smaller.

Conversely, the bent portion 12 may be such that the first major surface 2 is bent convexly and the second major surface 3 is bent concavely.

<Uses>

There are no particular limitations on the use of the glass substrate 1. For example, the glass substrate 1 is used as a cover glass of a display device. The glass substrate 1 is used preferably as a cover glass of an in-vehicle display device 21 among various kinds of display devices.

[Manufacturing Method of Glass Substrate]

Next, a method for manufacturing the above-described glass substrate 1 (for the sake of convenience, hereinafter referred to as a "present manufacturing method") is described.

<Preparation of Glass Plate>

First, a glass plate 31 is prepared. The glass plate 31 has a first major surface 32 which is one major surface, a second major surface 33 which is the other major surface, and an end surface 34 which is connected to the first major surface 32 and the second major surface 33.

The first major surface 32 of the glass plate 31 becomes the first major surface 2 of the glass substrate 1. The second major surface 33 of the glass plate 31 becomes the second major surface 3 of the glass substrate 1.

The thickness of the glass plate 31 is the same as that of the above-described glass substrate 1.

Example glass kinds of the glass plate 31 are soda-lime glass and aluminosilicate glass ($SiO_2$—$Al_2O_3$—$Na_2O$-based glass).

Example glass compositions of the glass plate 31 are ones described in paragraph [0019] of JP-A-2019-006650.

In the case where the glass plate 31 is subjected to chemically strengthening treatment (described later), for example, aluminosilicate glass-based glass for chemical strengthening ("Dragontrail" (registered trademark) produced by AGC Inc.) is used preferably.

<Grinding>

Figure 4:
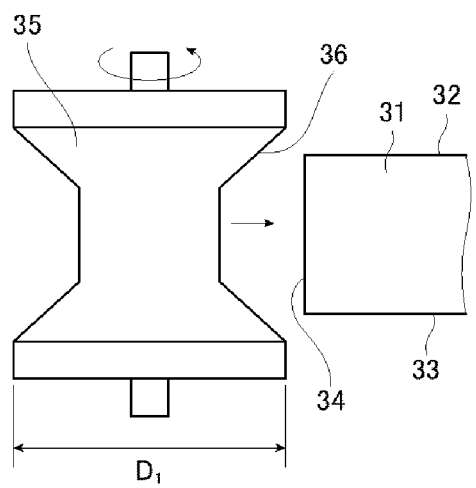
FIG. 4 is a sectional view illustrating how a glass plate is ground using a rotary whetstone.

FIG. 4 is a sectional view illustrating how the glass plate 31 is ground using a rotary whetstone 35.

Subsequently, as shown in FIG. 4, an end portion of the glass plate 31 is ground using the rotary whetstone 35; that is, the glass plate 31 is subjected to what is called chamfering.

A grinding surface 36 which is an outer circumferential surface of the rotary whetstone 35 is formed with a ring-shaped grinding groove which extends in the circumferential direction. The grinding surface 36 contains abrasive grains made of alumina, silicon carbide, diamond, or the like. There are no particular limitations on the grain size of the abrasive grains (JIS R 6001); for example, a grain size is selected from a range of #300 to #2000.

The rotary whetstone 35 grinds, by its grinding surface 36, an end portion of the glass plate 31 by moving along and relative to the end portion of the glass plate 31 while rotating around the center line of the rotary whetstone 35. A cooling liquid such as water may be used during the grinding.

In this manufacturing method, the grinding surface 36 of the rotary whetstone 35 at least has a shape that conforms to a desired shape of the chamfered portion (first boundary surface 5 and second boundary surface 6) of the glass substrate 1 (however, in FIG. 4 the grinding surface 36 does not have such a shape because it is a schematic view). Such a rotary whetstone 35 can be obtained as a custom-made product.

The above-described glass substrate 1 is obtained by grinding and chamfering an end portion of the glass plate 31 using the rotary whetstone 35 as described above.

To obtain the glass substrate 1 as shown in FIG. 3, it is necessary that the glass plate 31 also is bent. In this case, a glass plate 31 having the same radius of curvature as the bent portion 12 of the glass substrate 1 does is used.

In grinding a bent glass plate 31, if the diameter $D_1$ of the rotary whetstone 35 is too large, a corner, for example, of the rotary whetstone 35 may hit the glass plate 31 on the side of the concave surface of the bent glass plate 31 and likely form chips.

In view of this, in grinding a bent glass plate 31, it is preferable that the diameter $D_1$ of the rotary whetstone 35 is smaller than the radius of curvature of the glass plate 31. This measure suppresses formation of chips. Taking a circumferential speed of the whetstone into consideration, it is preferable that the diameter $D_1$ of the rotary whetstone is 5 to 30 mm.

As long as the above-described glass substrate 1 can be obtained finally, the grinding may be performed in such a manner that rough working is performed first using a rotary whetstone having a large grain size and then finishing is performed using a rotary whetstone having a small grain size.

Furthermore, as long as the above-described glass substrate 1 can be obtained, the grinding may be performed using a grinding tool other than a rotary whetstone. However, from the viewpoint of productivity, use of a rotary whetstone is preferable.

<Chemically Strengthening Treatment>

Chemically strengthening treatment may be performed on a glass plate 31 which has been ground. In this case, a glass plate 31 as subjected to the chemically strengthening treatment becomes the glass substrate 1.

Where chemically strengthening treatment is performed, glass for chemical strengthening is used as the glass plate 31.

A method that is known in the art can be employed to perform the chemically strengthening treatment; typically, the glass plate 31 is immersed in molten salt. As a result, in a surface layer of the glass plate 31, alkali ions (Li ions and/or Na ions) are replaced by other alkali ions having a larger ion radius (or radii) in the molten salt (Na ions and/or K ions) by ion exchange. A layer where compressive stress has been produced by density increase (compressive stress layer) is formed in the surface layer of the glass plate 31 by this ion exchange. The glass plate 31 can be strengthened in this manner.

Where the alkali ions existing in the glass plate 31 are Na ions, it is preferable that the molten salt (inorganic salt composition) contains potassium nitrate ($KNO_3$). Processing conditions such as a molten salt temperature and an immersion time may be set so that the compressive stress value (CS) and the thickness (DOL) of a compressive stress layer and other parameters have desired values.

In the present manufacturing method, the first major surface 2 and/or the second major surface 3 of the glass substrate 1 may be formed with a functional layer as appropriate.

EXAMPLES

The embodiment of the invention is hereinafter described in a specific manner using Examples etc. However, the invention is not limited to the following examples. In the following description, Examples 1 to 4 and 7 are Working Examples and Examples 5 and 6 are Comparative Examples.

Example 1

"Dragontrail" produced by AGC Inc. was prepared as a glass plate 31. The size of the major surfaces (first major surface 32 and second major surface 33) of the glass plate 31 was 1,200 mm×300 mm. The thickness of the glass plate 31 was 2.0 mm.

The glass plate 31 was bent in such a direction that the first major surface 32 was concave and the radius of curvature of the glass plate 31 was 50 mm.

Subsequently, a glass substrate 1 of Example 1 was obtained by grinding an end portion of the thus-prepared glass plate 31 using a rotary whetstone 35 which was a custom-made product having a particular grinding surface 36.

The diameter $D_1$ of the rotary whetstone 35 was 20 mm. The grinding surface 36 of the rotary whetstone 35 had abrasive grains made of diamond whose grain size was #800.

Wet-type grinding was performed; that is, water was used as a cooling liquid during grinding.

The glass plate 31 was chamfered by grinding using the rotary whetstone 35, whereby an end surface 4, a first boundary surface 5, a second boundary surface 6, a third boundary surface 7, and a fourth boundary surface 8 were formed.

A radius of curvature $R_1$ of the first boundary surface 5, a radius of curvature $R_2$ of the second boundary surface 6, an angle $\theta_1$ formed by the second boundary surface 6 and the first major surface 2, a chip size in the second boundary surface 6, and a surface width ($|L_1-L_2|$) (as well as those of each of Examples 2 to 7) are shown in Table 1 below.

Examples 2 to 7

In each of Examples 2 to 7, a glass substrate 1 was obtained by grinding the glass plate 31 using a rotary whetstone 35 that is different in the shape of the grinding surface 36 from the rotary whetstone 35 used in Example 1.

In Examples 5 and 6, instead of a curved surface, a flat surface that was not curved was formed as a second boundary surface 6. Thus, a mark "-" is written in the corresponding boxes of the radius of curvature $R_2$ of the second boundary surface 6 of Table 1 below.

In Example 6, differently than in Examples 1 to 5, the diameter $D_1$ of the rotary whetstone 35 was 50 mm.

<Evaluations>

Eleven subjects who were in their 30 s to 60 s were requested to evaluate the glass substrates 1 of Examples 1 to 7.

First, each subject was requested to hold each glass substrate 1 on which light was shining in such a manner that he or she was opposed to its first major surface 2 with a distance of 60 cm and to see the chamfered portion of the glass substrate 1 (first boundary surface 5 and second boundary surface 6) from various angles. Each subject was then requested to determine an angle A at which he or she felt that reflection light coming from the chamfered portion was strongest.

During the above evaluation procedure, the illuminance of light shining on the glass substrate 1 was varied in order from 1,000 lx (corresponding to illuminance of a fluorescent lamp) to 15,000 lx (corresponding to illuminance that is a little higher than in shade at the time of fine weather). Each subject was requested to record illuminance at which he or she felt that reflection light coming from the chamfered portion of the glass substrate 1 was dazzling when the glass substrate 1 was seen at the angle A.

An average value (in the following part of this paragraph, simply referred to as "illuminance") of illuminance values at which the eleven subjects felt dazzling, respectively, was determined. In Table 1 below, marks "C," "B," and "A" are written when the "illuminance" was lower than 4,000 lx, higher than or equal to 4,000 lx and lower than 8,000 lx, and 8,000 lux or higher, respectively. Higher "illuminance" means that the dazzlingness of reflection light coming from the chamfered portion of the glass substrate 1 is suppressed more, providing an evaluation that the chamfered portion antiglare property is higher.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| Diameter $D_1$ of rotary whetstone (mm) | 20 | 20 | 20 | 20 | 20 | 50 | 20 |
| Radius of curvature $R_1$ of first boundary surface (mm) | 0.4 | 0.6 | 0.2 | 0.2 | 0.4 | 0.4 | 0.4 |
| Radius of curvature $R_2$ of second boundary surface (mm) | 0.6 | 0.4 | 0.6 | 1.3 | — | — | 0.5 |
| Angle $\theta_1$ formed by second major surface and first major surface (°) | 30 | 30 | 30 | 40 | 45 | 45 | 30 |

TABLE 1-continued

|  | Ex. 1 | Ex. 2 | Ex. 3 | Ex. 4 | Ex. 5 | Ex. 6 | Ex. 7 |
|---|---|---|---|---|---|---|---|
| Chip size (mm) | 0.02 | 0.02 | 0.03 | 0.04 | 0.06 | 0.10 | 0.02 |
| Surface width ($|L_1 - L_2|$) (mm) | 0.1 | 0.1 | 0.1 | 0.1 | 0.1 | >0.2 | 0.1 |
| Chamfered portion antiglare property | A | B | A | A | C | C | B |

<Summary of Evaluation Results>

As seen from the results shown in Table 1 above, Examples 1 to 4 and 7 are higher in chamfered portion antiglare property than Examples 5 and 6 in which the second boundary surface 6 was a flat surface.

Comparison between Examples 1 and 2 shows that Example 1 in which the radius of curvature $R_2$ was larger than the radius of curvature $R_1$ was higher in chamfered portion antiglare property than Example 2 in which the radius of curvature $R_1$ was larger than the radius of curvature $R_2$.

Comparison between Examples 1 and 7 that were different from each other only in the radius of curvature $R_2$ shows that Example 1 in which the radius of curvature $R_2$ was 0.6 mm was higher in chamfered portion antiglare property than Example 7 in which the radius of curvature $R_2$ was 0.5 mm.

Although the invention has been described in detail by referring to the particular embodiment, it is apparent to those skilled in the art that various changes and modifications are possible without departing from the spirit and scope of the invention.

DESCRIPTION OF SYMBOLS

1: Glass substrate
2: First major surface
3: Second major surface
4: End surface
5: First boundary surface
6: Second boundary surface
7: Third boundary surface
8: Fourth boundary surface
12: Bent portion
21: In-vehicle display device
22: Body
23: Backlight unit
24: Display panel
25: Adhesive layer
31: Glass plate
32: First major surface of glass plate
33: Second major surface of glass plate
34: End surface of glass plate
35: Rotary whetstone
36: Grinding surface
$D_1$: Diameter of rotary whetstone
$R_1$: Radius of curvature of first boundary surface
$R_2$: Radius of curvature of second boundary surface
$\theta_1$: Angle formed by second boundary surface and first major surface
$L_1$: Distance from end surface to first major surface in the direction of tangential line, extending from the end surface toward first major surface
$L_2$: Distance from end surface to second major surface in the direction of tangential line, extending from the end surface toward second major surface

The invention claimed is:

1. A glass substrate comprising:
a first major surface;
a second major surface that is opposite to the first major surface;
an end surface interposed between the first major surface and the second major surface;
a first boundary surface that is interposed between the first major surface and the end surface and connected to the end surface; and
a second boundary surface that is connected to the first major surface and the first boundary surface,
wherein the second boundary surface is a convex curved surface,
the second boundary surface has a radius of curvature $R_2$ of 0.3 mm or larger and 2.0 mm or smaller,
a chip size in the second boundary surface is 0.08 mm or smaller, and
an angle $\theta_1$ formed by the second boundary surface and the first major surface is 15° or larger and 45° or smaller.

2. The glass substrate according to claim 1,
wherein the first boundary surface is a convex curved surface, and
the first boundary surface has a radius of curvature $R_1$ of 0.1 mm or larger and 1.0 mm or smaller.

3. The glass substrate according to claim 2,
wherein the radius of curvature $R_2$ of the second boundary surface is larger than the radius of curvature $R_1$ of the first boundary surface.

4. The glass substrate according to claim 1, comprising a bent portion where the first major surface and the second major surface are bent.

5. The glass substrate according to claim 1,
wherein a difference between a distance $L_1$ from the end surface to the first major surface and a distance $L_2$ from the end surface to the second major surface is 0.2 mm or smaller.

6. The glass substrate according to claim 1, wherein the glass substrate is used as a cover glass of a display device.

7. The glass substrate according to claim 6, wherein the display device is an in-vehicle display device.

8. The glass substrate according to claim 1, wherein the radius of curvature $R_2$ of the second boundary surface is larger than a radius of curvature $R_1$ of the first boundary surface.

9. A method for manufacturing the glass substrate according to claim 1, comprising:
preparing a glass plate; and
grinding the glass plate using a rotary whetstone,
wherein the rotary whetstone has a grinding surface that is shaped so as to conform to shapes of the first boundary surface and the second boundary surface.

* * * * *